US012596989B2

(12) United States Patent
Kondo et al.

(10) Patent No.: US 12,596,989 B2
(45) Date of Patent: Apr. 7, 2026

(54) ARTICLE SUPPLY DEVICE AND ARTICLE SUPPLY SYSTEM

(71) Applicant: BANDAI CO., LTD., Tokyo (JP)

(72) Inventors: Hajime Kondo, Tokyo (JP); Nobuo Kurokawa, Tokyo (JP); Hiroki Kobayashi, Tokyo (JP); Kenichi Minagawa, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 608 days.

(21) Appl. No.: 17/617,394

(22) PCT Filed: Jun. 24, 2020

(86) PCT No.: PCT/JP2020/024726
§ 371 (c)(1),
(2) Date: Dec. 8, 2021

(87) PCT Pub. No.: WO2021/010111
PCT Pub. Date: Jan. 21, 2021

(65) Prior Publication Data
US 2022/0237553 A1     Jul. 28, 2022

(30) Foreign Application Priority Data
Jul. 12, 2019    (JP) ................................. 2019-130711

(51) Int. Cl.
*G06Q 10/087*          (2023.01)
(52) U.S. Cl.
CPC .................................. *G06Q 10/087* (2013.01)

(58) Field of Classification Search
CPC ..... G07F 9/00; G07F 5/02; G07F 9/02; G07F 11/44; G07F 11/00; G07F 11/54; G06Q 10/087
(Continued)

(56) References Cited

U.S. PATENT DOCUMENTS

| 3,264,478 A | * | 8/1966 | Moldovan | ................. | G04F 8/08 |
| | | | | | 250/206 |
| 7,182,219 B2 | * | 2/2007 | Chang | .................... | G07F 11/10 |
| | | | | | 221/133 |

(Continued)

FOREIGN PATENT DOCUMENTS

| CN | 105825588 A | 8/2016 |
| CN | 108961549 A | 12/2018 |

(Continued)

OTHER PUBLICATIONS

PCT/JP2020/024726 International Search Report and Written Opinion mailed Aug. 25, 2020, English translation of search report.

*Primary Examiner* — Rakesh Kumar
(74) *Attorney, Agent, or Firm* — Buchalter LLP

(57) ABSTRACT

[Problem] To provide an article supply device capable of substantially eliminating inconveniences caused by a sold-out state. [Solution] An article supply device 100 comprises: an article supply means (an article supply unit 108, etc.) capable of supplying articles AR in an article storage unit 102 by applying a supply operation to a supply operation unit 103; and a sold-out state signal transmission means (a sold-out state detection unit 152, etc.) capable of transmitting a sold-out state signal once the article storage unit 102 has run out of the articles AR.

16 Claims, 3 Drawing Sheets

(58) Field of Classification Search
USPC ............................................................. 221/6
See application file for complete search history.

(56) References Cited

U.S. PATENT DOCUMENTS

| 8,651,321 | B2 * | 2/2014 | Fu | G07F 11/24 |
| | | | | 221/217 |
| 2008/0135374 | A1 * | 6/2008 | Atsuta | G06Q 20/327 |
| | | | | 194/350 |
| 2009/0250484 | A1 * | 10/2009 | Kling | B65H 43/02 |
| | | | | 221/14 |
| 2014/0143077 | A1 * | 5/2014 | Shah | G07F 11/10 |
| | | | | 705/16 |

FOREIGN PATENT DOCUMENTS

| JP | 09-054869 | A | | 2/1997 |
| JP | H0954869 | A | * | 2/1997 |
| JP | 10-27278 | A | | 1/1998 |
| JP | H1027278 | A | * | 1/1998 |
| JP | 2003187319 | A | | 7/2003 |
| JP | 2003346228 | A | * | 12/2003 |
| JP | 2006178610 | A | | 7/2006 |
| JP | 2006178612 | A | * | 7/2006 |
| JP | 2007034603 | A | * | 2/2007 |
| JP | 4536616 | B2 | | 6/2010 |
| JP | 2019023897 | A | * | 2/2019 |
| JP | 2019200821 | A | * | 11/2019 |
| WO | WO 2012/010111 | A1 | | 1/2021 |

* cited by examiner

151
MAIN CONTROLLER

152
SOLD-OUT DETECTION UNIT

153
SUPPLY DETECTION UNIT 154        154a
TRANSMISSION UNIT

STORE X (NUMBER OF INSTALLED DEVICES: 6)

| ARTICLE SUPPLY DEVICE | MAXIMUM CONTAINABLE NUMBER OF ARTICLES | CONTAINED ARTICLE | STATE | REMAINING NUMBER OF CONTAINED ARTICLES |
|---|---|---|---|---|
| Y1 | 40 | AR1 | SOLD OUT | 0 |
| Y2 | 40 | AR2 | NOT SOLD OUT | 30 |
| Y3 | 40 | AR3 | NOT SOLD OUT | 20 |
| Y4 | 40 | AR4 | NOT SOLD OUT | 25 |
| Y5 | 40 | AR5 | NOT SOLD OUT | 5 |
| Y6 | 40 | AR6 | NOT SOLD OUT | 35 |

ARTICLE SUPPLY DEVICE AND ARTICLE SUPPLY SYSTEM

CROSS REFERENCE TO RELATED APPLICATIONS

This application is a national stage application, filed under 35 U.S.C. § 371, of International Application No. PCT/JP2020/024726, filed Jun. 24, 2021, which claims priority to Japan Application No. 2019-130711, filed Jul. 12, 2019, the contents of both of which as are hereby incorporated by reference in their entirety.

BACKGROUND

Technical Field

The present invention relates to an article supply device that can supply an article in accordance with a supply operation and an article supply system using the article supply device.

Description of Related Art

In PTL 1, which is described later, a vending machine (hereinafter simply referred to as device) is disclosed that can discharge a capsule item in a box from a drum to an item discharge port in response to a handle being turned after insertion of a coin to rotate the drum. This device has a liquid crystal display means. When the capsule item is out of stock in the box, the apparatus can cause the liquid crystal display means to indicate that the capsule item is sold out The above selling out is generally confirmed by an on-the-road staff member of a maintenance contractor to which management of the device is entrusted or an employee of a store where the device is installed, and thus there may be a time difference between the time when the capsule item actually sold out and the time when the selling out is actually confirmed. This time difference corresponds to the duration of a sold-out state, and thus especially when the sold-out state is of long duration, there are concerns that, for example, prospective consumers would feel inconvenienced and their impression of the store would worsen.

CITATION LIST

Patent Literature

PTL 1: Japanese Unexamined Patent Application Publication No. 2006-178612

BRIEF SUMMARY

A problem to be solved by the present invention is to provide an article supply device and an article supply system that can minimize inconvenience due to selling out.

An article supply device according to the present invention includes an article supply means capable of supplying an article in an article container unit in response to a supply operation performed on a supply operation unit, and a sold-out signal transmission means capable of transmitting a sold-out signal when the article is out of stock in the article container unit. An article supply system according to the present invention includes at least one of the above article supply device, and a communication means capable of transmitting, to a management server, the sold-out signal from the article supply device via a communication network.

Furthermore, an article supply system according to the present invention includes at least one of the above article supply device, a communication means capable of transmitting the sold-out signal from the article supply device, and a management server capable of receiving the sold-out signal from the communication means via a communication network.

With an article supply device and an article supply system according to the present invention, inconvenience due to selling out can be minimized.

BRIEF DESCRIPTION OF THE FIGURES

FIG. 1(A) is a front view of an article supply device, which is an application of the present invention, FIG. 1(B) is a left side view of the article supply device, FIG. 1(C) is a vertical sectional view of the article supply device, and FIGS. 1(D) and 1(E) are diagrams for describing articles that can be contained in an article container unit illustrated in FIGS. 1(A) to 1(C).

FIGS. 2(A) and 2(B) are diagrams for describing a supply blocking unit illustrated in FIG. 1(A).

FIG. 3 is a diagram for describing a control system of the article supply device illustrated in FIGS. 1(A) to 1(C).

DETAILED DESCRIPTION OF VARIOUS EMBODIMENTS

Figures 1, 2, 3:
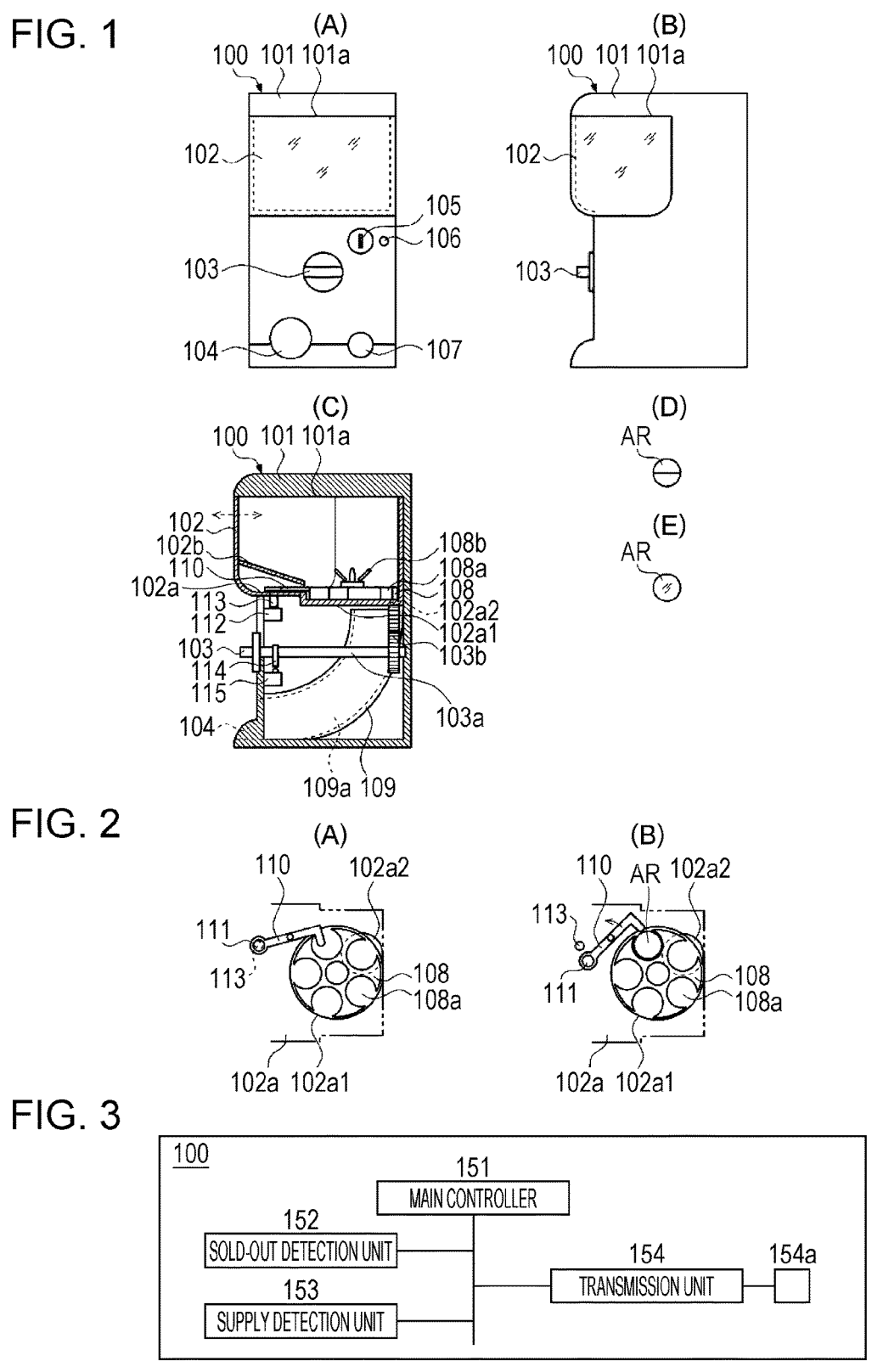
Figure 4:
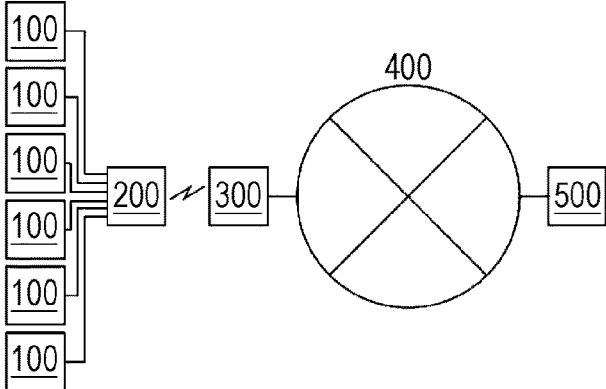
FIG. 4 is a schematic diagram of an article supply system, which is an application of the present invention.

FIGS. 1(A) to 1(C) illustrate the configuration of an article supply device 100 according to an application of the present invention. FIGS. 1(D) and 1(E) illustrate articles AR. FIGS. 2(A) and 2(B) illustrate the configuration and operation of a supply blocking unit 110. FIG. 3 illustrates a control system of the article supply device 100.

First, the configurations of the articles AR and the configuration of the article supply device 100 will be described. In a description of the article supply device 100, for convenience' sake, the front side of FIG. 1(A) is referred to as front, the depth side of FIG. 1(A) as rear, the left side of FIG. 1(A) as right, the right side of FIG. 1(A) as left, the upper side of FIG. 1(A) as up, and the lower side of FIG. 1(A) as down. Substantially the same applies to the directions in FIGS. 1(B), 1(C), 2(A), and 2(B). A state where there is an article AR in an article container unit 102 of the article supply device 100 is referred to as a "not-sold-out state", and a state where there is not an article AR in the article container unit 102 is referred to as a "sold-out state".

Regarding the articles AR, there are no special limitations as long as the articles AR have spherical external shapes or shapes similar to a sphere, that is, as long as the articles can roll. A specific example may be an article formed by a capsule having a toy inside, the capsule being constituted by two capsule constituent parts that are detachable from and attachable to each other (see FIG. 1(D)), an article obtained by covering, with a film or the like, the surface of a toy folded into a somewhat spherical shape (see FIG. 1(F)), or the like. Although depending on the outer shapes of the articles AR, the maximum containable number of articles AR in the article container unit 102 is set within a range from about 40 to 120.

The article supply device 100 includes a device main unit 101, the article container unit 102, a supply operation unit 103, an article supply means (no reference numeral), an article outlet 104, a coin slot 105, a coin return button 106, a coin return slot 107, a sold-out signal transmission means (no reference numeral), and a supply signal transmission means (no reference numeral) (see FIGS. 1(A), 1(B), and 1(C)).

Note that the coin slot 105 is a section from which a coin such as a 500 yen coin is inserted, the coin return button 106 is an item for returning the inserted coin, and the coin return slot 107 is a section from which a returned coin is taken out. These are publicly known, for example, from Japanese Unexamined Patent Application Publication No. 2016-053993 of the applicant of the present application, and thus detailed description thereof will be omitted.

The exterior of the device main unit 101 has a substantially rectangular parallelepiped shape, and the upper portion of the front surface, the left side surface, and the right side surface of the device main unit 101 is open such that a container entrance port 101a is provided (see FIGS. 1(A) and 1(B)). That is, the article container unit 102 is arranged such that the front wall and front portions of the left and right side walls are exposed and such that the article container unit 102 can be pulled out from the device main unit 101. The article container unit 102 can be pulled out through the container entrance port 101a toward the front by unlocking a lock unit that is not illustrated (see FIG. 1(C)).

The article container unit 102 includes an open-topped box having a substantially rectangular parallelepiped shape, and at least the front wall and the front portions of the left and right side walls of the article container unit 102 are made transparent or semi-transparent (see FIGS. 1(A), 1(B), and 1(C)). That is, a printed sheet (not illustrated) that is arranged inside the front wall (for example, a sheet presenting a picture or a description of an article AR) can be visually recognized from the outside through the front wall, and the article AR contained in the article container unit 102 can be visually recognized from the outside through the front portions of the left and right side walls.

The top surface of a lower wall 102a of the article container unit 102 is flat, and a slope unit 102b for guiding articles AR backward is formed on a front portion of the top surface of the lower wall 102a (see FIG. 1(C)). Furthermore, a rear portion of the top surface of the lower wall 102a has a hollow section 102a1, which is circular in top view, and the bottom surface of the hollow section 102a1 has an article supply port 102a2, which is circular in top view (see FIGS. 1(C), 2(A), and 2(B)).

The supply operation unit 103 has a disc shape with a knob and is arranged on the front surface of the front wall of the device main unit 110 so as to be rotatable (see FIGS. 1(A) and 1(B)). A front end of a shaft 103a is coupled to the supply operation unit 103, and a rear end of the shaft 103 is supported by the front surface of the rear wall of the device main unit 110 so as to be rotatable (see FIG. 1(C)). The supply operation unit 103 is a portion on which a supply operation is performed, and the supply operation is for example a 360-degree rotation of the supply operation unit 103 when the supply operation unit 103 is viewed from the front. A gear mechanism 103b including a plurality of gears, which can transfer rotation of the shaft 103 to an article supply unit 108, is provided at and above the rear portion of the shaft 103a of the supply operation unit 103 (see FIG. 1(C)).

The article supply means (no reference numeral) includes the article supply unit 108, a supply path unit 109, and the supply blocking unit 110 (see FIGS. 1(C), 2(A), and 2(B)). The article supply unit 108 can supply an article AR in response to an operation based on the supply operation performed in the not-sold-out state. The supply path unit 109 guides, to the article outlet 104, the article AR supplied from the article supply unit 108. The supply blocking unit 110 makes the article supply unit 108 inoperable in the sold-out state even when the supply operation is performed.

The article supply unit 108 has an overall disc shape and has a plurality of support holes 108a (five support holes in the drawings) spaced angularly uniformly in top view (see FIGS. 2(A) and 2(B)). The top view shape of each support hole 108a is a circle slightly larger than the outside shape of the article AR, and the outer side of an inner peripheral surface of each support hole 108a is partially open. The article supply unit 108 is arranged in the hollow section 102a1 of the article container unit 102 so as to be rotatable and such that the upper portion of each article support hole 108 protrudes upward from the top surface of the lower wall 102a of the article container unit 102 (see FIG. 1(C)).

The top surface of the article supply unit 108 has an agitation unit 108b in the center thereof (see FIG. 1(C), not illustrated in FIG. 2). The agitation unit 108b includes a center protrusion and a plurality of flexible parts (for example, items like extension coil springs) arranged around the center protrusion.

Furthermore, although not illustrated, teeth are provided along the periphery of the bottom surface of the article supply unit 108, the teeth being similar to face gear teeth. Some of the teeth are positioned in a hole provided in the bottom surface of the hollow section 102a1 of the article container unit 102 and engage with the top gear of the gear mechanism 103b of the supply operation unit 103. That is, the article supply unit 108 can rotate by a predetermined angle in response to the performed supply operation.

The supply path unit 109 has a tubular shape that is curved or bent as a whole and has a supply path 109a extending from a lower end of the article supply port 102a2 present at the bottom surface of the hollow section 102a1 of the article container unit 102 to a rear end of the article outlet 104 (see FIG. 1(C)). In this regard, the supply path unit 109 does not have to have a tubular shape as long as the supply path unit 109 can guide, to the article outlet 104, the article AR supplied from the article supply unit 108. For example, a curved or bent groove provided inside the device main unit 101 can be substituted.

The supply blocking unit 110 is formed of a part that is overall L-shaped or J-shaped, is arranged on the top surface of the lower wall 102a of the article container unit 102 so as to be rotatable, and is urged in a clockwise direction, when viewed in top view, by a spring member such as a helical torsion spring or a compression spring, which is not illustrated (see FIGS. 2(A) and 2(B)).

That is, when the state enters the sold-out state, and an article AR is not held in an upper-left support hole 108a of the supply unit 108 in FIG. 2(A), a rear end portion of the supply blocking unit 110 is rotated and displaced so as to enter the support hole 108a, so that the supply blocking unit 110 can make the article supply unit 108 inoperable.

In contrast, when the state is the not-sold-out state, and an article AR is held in the upper-left support hole 108a of the article supply unit 108 in FIG. 2(B), the supply blocking unit 110 cannot be displaced as above due to the article AR, and thus the supply blocking unit 110 cannot make the article supply unit 108 inoperable.

The sold-out signal transmission means (no reference numeral) is a means that can transmit a sold-out signal when the state enters the sold-out state, and includes a sold-out detection unit 152, which can detect selling out when the supply blocking unit 110 is rotated and displaced to a position at which the supply blocking unit 110 makes the article supply unit 108 inoperable (see FIG. 3). The sold-out detection unit 152 includes, for example, at least a magnet unit 111, which is provided at a front end portion of the supply blocking unit 110, and a first switch unit 112, which is operated by magnetic force from the magnet unit 111 (see FIGS. 1(C) and 2(B)).

In the illustrated example, the magnet unit 111 is provided in the article container unit 102, and the first switch unit 112 is provided (lower than the article container unit 102) in the device main unit 101. Thus, the lower wall 102*a* of the article container unit 102 is provided with a columnar magnetic material unit for transferring magnetic force from the magnet unit 111 to the first switch unit 112 (see FIGS. 1(C), 2(A), and 2(B)). In this regard, the magnet unit 111 preferably includes a rare earth magnet such as a neodymium magnet or a samarium-cobalt magnet, the first switch unit 112 preferably includes a reed switch, and the magnetic material unit 113 preferably includes a ferromagnet such as iron. Note that in a case where the first switch unit 112 can be provided on the article container unit 102 side, the magnetic material unit 113 is not always necessary.

That is, when the state enters the sold-out state, and an article AR is not held in the upper-left support hole 108*a* of the article supply unit 108 in FIG. 2(A), the rear end portion of the supply blocking unit 110 is rotated and displaced so as to enter the upper-left support hole 108*a*, so that the magnet unit 111 is displaced onto the magnetic material unit 113 by the rotational displacement. Thus, magnetic force from the magnet unit 111 is transferred via the magnetic material unit 113 to the first switch unit 112, and the first switch unit 112 can be operated.

In contrast, when the state is the not-sold-out state, and an article AR is held in the upper-left support hole 108*a* of the article supply unit 108 in FIG. 2(B), the supply blocking unit 110 cannot be displaced as above due to the article AR, and the magnet unit 111 is positioned away from the magnetic material unit 113. Thus, the first switch unit 112 cannot be operated.

The supply signal transmission means (no reference numeral) is a means that can transmit a supply signal in response to the supply operation performed when there is an article AR in the article container unit 102, and includes a supply detection unit 153, which can detect supply when the supply operation is performed (see FIG. 3). The supply detection unit 153 includes, for example, a switch operation unit 114, which can be displaced on the basis of performance of the supply operation, and a second switch unit 115, which operates on the basis of the displacement of the switch operation unit 114 (see FIG. 1(C)).

The switch operation unit 114 preferably includes a rotation displacement part such as an eccentric cam provided at the shaft unit 103*a* of the supply operation unit 103. The second switch unit 115 preferably includes a press switch such as a microswitch, the press switch being capable of operating when the rotation displacement part is displaced partway such as when the supply operation unit 103 is rotated by 180 degrees to 270 degrees (see FIG. 1(C)).

That is, in a case where the supply operation is performed on the supply operation unit 103 in the not-sold-out state, and the shaft unit 103*a* and the switch operation unit 114 rotate by 360 degrees, the second switch unit 115 can be operated one time when the switch operation unit 114 is rotated and displaced partway.

Next, the control system of the article supply device 100 described above will be described. This control system includes, as illustrated in FIG. 3, a main controller 151 having a microcomputer configuration, the sold-out detection unit 152, the supply detection unit 153, and a transmission unit 154.

The sold-out detection unit 152 includes the above first switch unit 112, and the supply detection unit 153 includes the above second switch unit 115. The transmission unit 154 has a dual-purpose output terminal 154*a*, which can transmit a sold-out signal (preferably, a binary signal) detected by the sold-out detection unit 152 and a supply signal (preferably, a binary signal) detected by the supply detection unit 153. The output terminal 154*a* is provided at the back surface of the device main unit 101. Power for the control system may be acquired from a commercial power supply using an alternating-current-to-direct-current (AC-DC) adapter other than from batteries or rechargeable batteries.

Next, the operation of the article supply device 100 described above will be described.

When a certain coin is inserted into the coin slot 105 and the supply operation is performed on the supply operation unit 103 in the not-sold-out state (see FIG. 1(C)), the article supply unit 108 rotates by a predetermined angle, the article AR held in the support hole 108*a* falls into the supply path unit 109 through the article supply port 102*a*2 (see FIG. 2(B)), and the article AR is guided to the article outlet 104 through the supply path 109*a*.

In contrast, when the state enters the sold-out state, the rear end portion of the supply blocking unit 110 enters the support hole 108*a*, and the article supply unit 108 is made inoperable (see FIG. 2(A)) as described above. Thus, the supply operation cannot be performed on the supply operation unit 103.

When the supply operation (a 360 degree rotation) is performed on the supply operation unit 103 in the not-sold-out state, the supply signal is transmitted to the output terminal 154*a* of the transmission unit 154, the supply signal being based on a detection signal from the second switch unit 115 included in the supply detection unit 153.

Furthermore, when the state enters the sold-out state, the sold-out signal is transmitted to the output terminal 154*a* of the transmission unit 154, the sold-out signal being based on a detection signal from the first switch unit 112 included in the sold-out detection unit 152.

In this regard, from one article supply device 100, the sold-out signal is normally transmitted after the supply signal is transmitted. In other words, the supply signal and the sold-out signal are not simultaneously transmitted from one article supply device 100, and thus signal control for transmitting these signals is unnecessary.

Thus, even when any one of a plurality of article supply devices 100 enters the sold-out state, the sold-out signal is immediately transmitted from the article supply device 100. Thus, the selling out of the article AR can be confirmed without a time lag by using the sold-out signal. The supply signal is transmitted every time the article AR is supplied in the not-sold-out state, and thus the remaining number of articles contained in each article supply device 100 can be checked using the supply signal.

Note that the above article supply device 100 may display a sold-out indication in order to allow consumers to visually confirm that the article supply device 100 is in the sold-out state. For this sold-out indication, for example, it is preferable that a mechanism as described in Japanese Unexamined Patent Application Publication No. 2016-053993 of the applicant of the present application be used. That is, in the mechanism, a sold-out display unit having a substantially L-shaped, longitudinal section is arranged so as to be rotatable inside the front wall of the article container unit 102, and the sold-out display unit can be recognized from the outside by being rotated using a rotational displacement to protrude downward from a hole provided in a front end of the lower wall 102a of the article container unit 102, the rotational displacement being caused when the rear end portion of the supply blocking unit 110 enters the upper-left support hole 108a of the article supply unit 108 in FIG. 2(A).

In a case where only the sold-out signal is transmitted, the supply signal transmission means (no reference numeral) may be eliminated from the above article supply device 100, and only the sold-out signal transmission means (no reference numeral) may be provided. Furthermore, the dual-purpose output terminal 154a provided at the transmission unit 154 may be divided into an output terminal for the sold-out signal detected by the sold-out detection unit 152 and an output terminal for the supply signal detected by the supply detection unit 153.

Article Supply System

Figure 5:
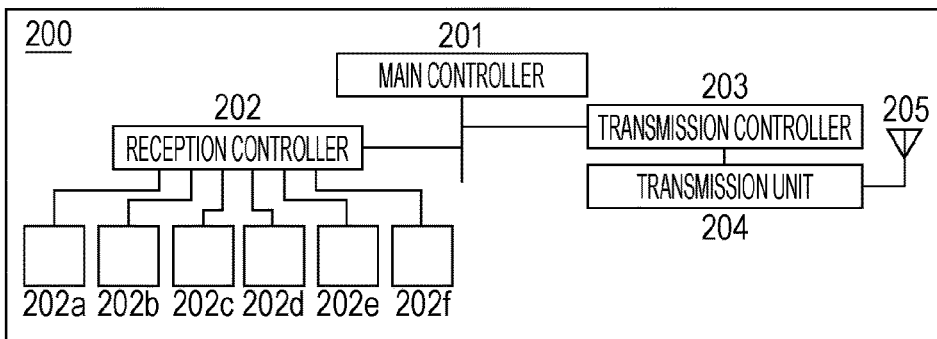
FIG. 5 is a diagram for describing a control system of a first communication apparatus illustrated in FIG. 4.
Figure 6:
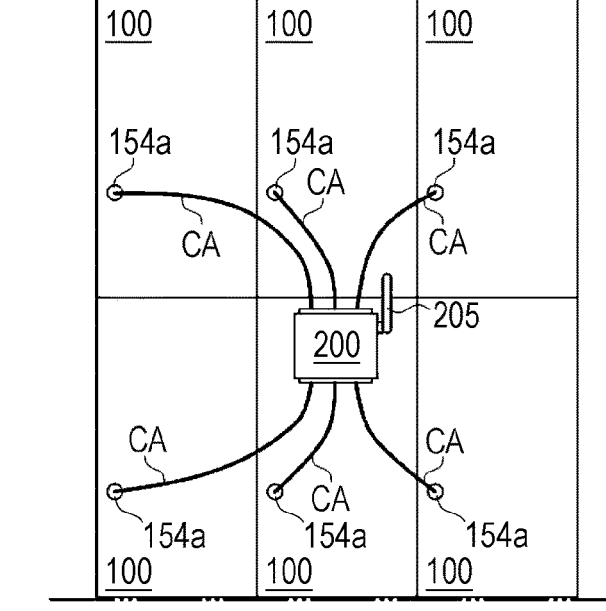
FIG. 6 is a diagram for describing a connection form of the first communication apparatus illustrated in FIG. 4.
Figure 7:
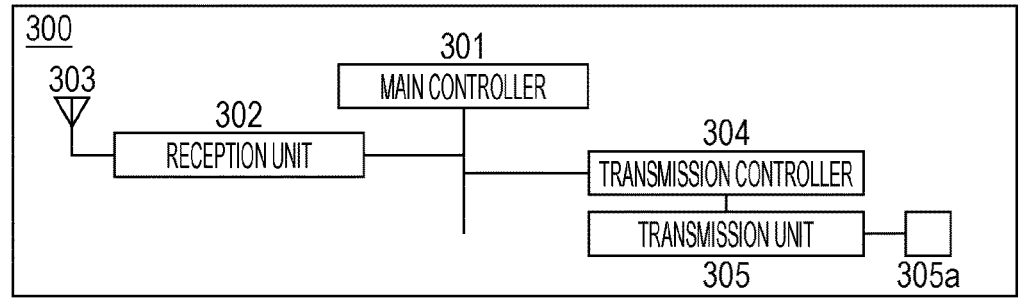
FIG. 7 is a diagram for describing a control system of a second communication apparatus illustrated in FIG. 4.
Figures 8, 9:
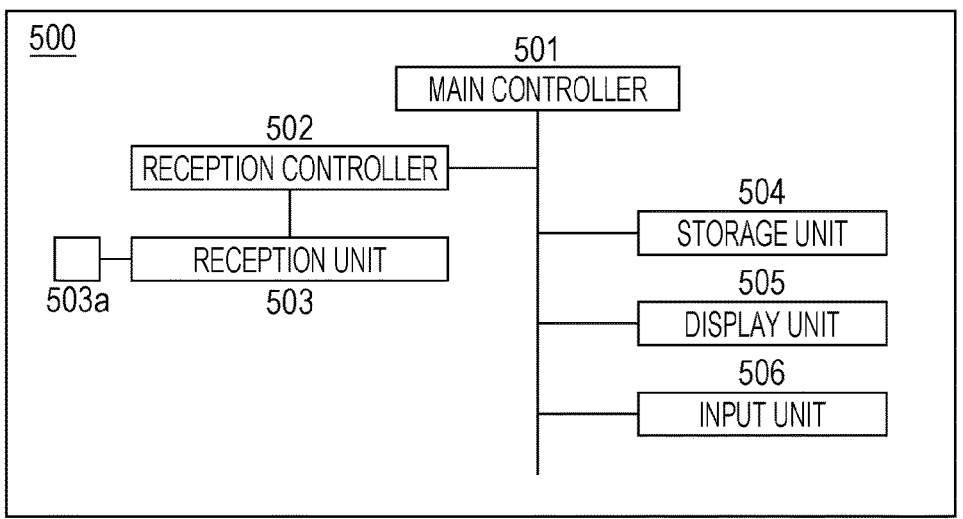
FIG. 8 is a diagram for describing a control system of a management server illustrated in FIG. 4.
FIG. 9 is a diagram illustrating an example of a management table displayed on a display unit of the management server illustrated in FIG. 4.

FIG. 4 illustrates a schematic configuration of an article supply system (no reference numeral) according to an application of the present invention. FIG. 5 illustrates a control system of a first communication apparatus 200. FIG. 6 illustrates a connection form of the first communication apparatus 200. FIG. 7 illustrates a control system of a second communication apparatus 300. FIG. 8 illustrates a control system of a management server 500. FIG. 9 illustrates an example of a management table displayed on a display unit 505 of the management server 500.

First, the configuration of the article supply system (no reference numeral) will be described. In a case where the management of article supply devices 100 is entrusted to a maintenance contractor, this article supply system (no reference numeral) includes one or more article supply devices 100 (six article supply devices in the illustrated example) installed in or near a store, and a communication means (no reference numeral) that can transmit the sold-out signal and the supply signal from each article supply device 100 to the management server 500 via a communication network 400 (the Internet communication network in the illustrated example), the communication means corresponding to the first communication apparatus 200 and the second communication apparatus 300 (see FIG. 4).

In other words, the article supply system (no reference numeral) includes one or more article supply devices 100 (six article supply devices in the illustrated example), a communication means (no reference numeral) that can transmit the sold-out signal and the supply signal from each article supply device 100 (the communication means corresponding to the first communication apparatus 200 and the second communication apparatus 300), and the management server 500, which can receive the sold-out signal and the supply signal from the communication means via the communication network 400.

The communication means (no reference numeral) includes the first communication apparatus 200 (see FIG. 5), which is connected to the output terminals 154a of the respective article supply devices 100 with dedicated cables CA (see FIG. 6), and the second communication apparatus 300, which can wirelessly communicate with the first communication apparatus 200 and can communicate with the management server 500 via the Internet communication network 400. That is, each article supply device 100, the first communication apparatus 200, and the second communication apparatus 300 are installed in the store (including at the front of and inside the store), and the maintenance contractor has the management server 500.

The control system of the first communication apparatus 200 includes, as illustrated in FIG. 5, a main controller 201 having a microcomputer configuration, a reception controller 202, a transmission controller 203, a transmission unit 204, and an antenna unit 205.

The reception controller 202 has a plurality of input terminals 202a to 202f (six input terminals in the illustrated example) and has, for example, the function of identifying, for each of the input terminals 202a to 202f, the article supply device 100 from which the sold-out signal and the supply signal input to the input terminal originated, and the function of preventing interference between two or more simultaneously input signals regardless of whether the signals are the sold-out or supply signals. The transmission controller 203 has, for example, the function of multiplexing signals from the reception unit controller 202 to perform conversion into a signal appropriate for the communication scheme of the transmission unit 204. The transmission unit 204 includes a transmission device that supports a wireless communication standard such as Bluetooth (registered trademark) or Wi-Fi (registered trademark), and can transmit a signal from the transmission controller 203 through the antenna unit 204. In this regard, power for the control system may be acquired from a commercial power supply using an AC-DC adapter other than from batteries or rechargeable batteries.

The identification and multiplexing described above will be described in more detail. The sold-out signals or the supply signals from two or more of the article supply devices 100 may be simultaneously transmitted to the first communication apparatus 200. Thus, to the sold-out signal and the supply signal from each article supply device 100, identification data corresponding to the article supply device 100 is assigned after the sold-out signal and the supply signal are input to the reception controller 202. Since the first communication apparatus 200 is connected to the six article supply devices 100, multiplexing is performed so that, for example, even in a case where the sold-out signal is transmitted from one out of two of the article supply devices 100 and the supply signal is transmitted from the other one of the two article supply devices 100, these signals can be transmitted without problems.

The control system of the second communication apparatus 300 includes, as illustrated in FIG. 7, a main controller 301 having a microcomputer configuration, a reception unit 302, an antenna unit 303, a transmission controller 304, and a transmission unit 305.

The reception unit 302 includes a reception device that supports the same wireless communication standard as the transmission unit 203 of the first communication apparatus 200, and can receive a signal from the first communication apparatus 200 through the antenna unit 303. The transmission controller 304 has, for example, the function of multiplexing signals from the reception unit 302 to perform conversion into a signal appropriate for the communication scheme of the transmission unit 305. The transmission unit 305 includes a transmission device that supports an Internet communication scheme such as TCP/IP, and has an output terminal 305*a*, which can be connected to the Internet communication network 400 via a modem or a router (not illustrated). In this regard, power for the control system may be acquired from a commercial power supply using an AC-DC adapter other than from batteries or rechargeable batteries.

The control system of the management server 500 includes, as illustrated in FIG. 8, a main controller 501 having a microcomputer configuration, a reception controller 502, a reception unit 503, a storage unit 504, the display unit 505 such as a liquid crystal display, and an input unit 506 such as a keyboard. In this regard, the management server 500 is a general-purpose computer to which a management function described below is added.

The reception unit 503 includes a reception device that supports an Internet communication scheme such as TCP/IP, and has an input terminal 503*a*, which can be connected to the Internet communication network 400 via a modem or a router (not illustrated). The reception controller 502 has, for example, the function of converting a signal from the reception unit 503 into a signal that can be processed internally. The storage unit 504 stores management data in which, for example, the number and the types of article supply devices 100 installed in a store, the maximum containable number of articles, contained articles, the state of each article supply device 100 (the sold-out state and the not-sold-out state), and the remaining number of contained articles are collected on a store-by-store basis. The display unit 505 displays a store-specific management table based on the above management data (see FIG. 9), and the input unit 506 is used when a numerical value or the like in the management table is changed.

Next, an example of a method for installing the six article supply devices 100, the first communication apparatus 200, and the second communication apparatus 300 of the above article supply system (no reference numeral) will be described.

First, the six article supply devices 100 are installed so as to be stacked as in FIG. 6 at the front of or inside the store (as a matter of course, the six article supply devices 100 may be installed side by side). The first communication apparatus 200 is fixed to the back surface of any one of the article supply devices 100 with screws or the like. The output terminals 154*a* of the respective article supply devices 100 and the input terminals 202*a* to 202*f* of the first communication apparatus 200 are connected by the dedicated cables CA.

The second communication apparatus 300 is installed inside the store, and its output terminal 305*a* is connected to the Internet communication network 400 via a modem or a router. Although the distance to be set between the first communication apparatus 200 and the second communication apparatus 300 depends on the presence or absence of an obstruction, it is desirable that the distance between the first communication apparatus 200 and the second communication apparatus 300 be less than or equal to 10 m when the wireless communication standard of the apparatuses is Bluetooth (registered trademark) and 30 mm when the wireless communication standard of the apparatuses is Wi-Fi (registered trademark).

Next, the operation of the above article supply system (no reference numeral) will be described, which includes the six article supply devices 100.

Description will be made starting from the state in which the above installation is completed and in which articles AR, the number of which is a maximum (for example, 40), are contained in the article container unit 102 of each article supply device 100. The numbers of articles AR in the article container units 102 of the individual article supply devices 100 gradually decrease due to the above supply operation performed by consumers. In this regard, the rates of decrease of the articles AR in the article container units 102 of the individual article supply devices 100 vary depending on demand, and thus the ways in which the articles AR decrease vary between the article supply devices 100.

The sold-out signal and the supply signal from each article supply device 100 are transmitted to the management server 500, which the maintenance contractor has, via the first communication apparatus 200, the second notification communication apparatus 300, and the Internet communication network 400 as described above.

When the management server 500 receives the above sold-out signal and the above supply signal, the management server 500 reads out management data on a store corresponding to the source of the signals from the storage unit 504 and displays the management table illustrated in FIG. 9 on the display unit 504. In this regard, the management table illustrated in FIG. 9 includes the number and the types of article supply devices 100 installed in a store X, the maximum containable number of articles, and contained articles, and furthermore display fields of the states of the respective article supply devices 100 (the sold-out state and the not-sold-out state) and the remaining number of contained articles.

For example, among six article supply devices Y1 to Y6 installed in the store X, when the management server 500 receives the sold-out signal regarding the article supply device Y1, the management table corresponding to the store X is displayed on the display unit 505, and also "sold out" is displayed in the state field of the article supply device Y1 in the management table, preferably in an enhanced manner. In this regard, the numerical value in the field of the remaining number of contained articles of the article supply device Y1 is reduced on the basis of reception of the supply signal, and thus the remaining number of contained articles at the stage when the sold-out signal is received is "0" as a general rule. That is, as a result of a change to "sold out" in the state field in the management table displayed on the display unit 505, it can be visually confirmed that the article supply device Y1 among the six article supply devices Y1 to Y6 installed in the store X is in the sold-out state and that the sold-out article AR is AR1.

Thus, in a case where an on-the-road staff member of the maintenance contractor replenishes the article supply device Y1 of the store X with articles AR1 on the basis of the display described above, the desired article supply device Y1 can be replenished with articles AR1 not long after the time when the article supply device Y1 actually entered the sold-out state. Moreover, regarding the article supply device Y5 having a small remaining number of contained articles (the remaining number of contained articles is 5), the day when the article supply device Y5 will enter the sold-out state can be roughly estimated, and thus preparations for the replenishment of articles AR5 can be made in advance before the article supply device Y5 enters the sold-out state.

Moreover, when the article supply device Y1 in the sold-out state is replenished with articles AR1, the supply blocking unit 110 illustrated in FIG. 2(A) is rotated and displaced to the position illustrated in FIG. 2(B), the sold-out signal transmission to the management server 500 is stopped, and the display in the state field of the article supply device Y1 is switched to "not sold out" (the remaining number of contained articles is also switched to 40). As a result of this switching in the display, the completion of replenishment of the desired article supply device Y1 with the articles AR1 can be confirmed.

There is a concern that the above sold-out signal would be momentarily generated when the article AR held in the support hole 108a lifts up due to, for example, the article supply device 100 itself receiving shock from the outside in the state illustrated in FIG. 2(B) and the supply blocking unit 110 is rotated and displaced. There is another concern that the above sold-out signal would be momentarily stopped when the supply blocking unit 110 is rotated and displaced due to inertia even in the state illustrated in FIG. 2(A). Thus, regarding the above sold-out signal, when the above sold-out signal continues for a predetermined time period or longer, specifically three seconds or longer, it is preferable that the management server 500 recognizes this as true selling out.

The above sold-out signal may be stopped for a moment due to, for example, shock from the outside as described above, and thus it is preferable that the time when the above supply signal is received after the above true selling out is recognized, that is, when the first article AR is supplied after replenishment be recognized as true sold-out elimination (completion of article replenishment).

Note that the communication network 400 in the above article supply system may be a communication network other than the Internet communication network such as a mobile phone communication network, a wide area network (WAN), or a local-area network (LAN). The case where the maintenance contractor has the management server 500 has been described; however, in a case where the article supply device or devices 100 are managed by the store (a case where management of the article supply device or devices 100 is not entrusted to a maintenance contractor), the management server 500 may be installed in, for example, an office of the store.

REFERENCE SIGNS LIST 100 article supply device
101 device main unit
102 article container unit
103 supply operation unit
108 article supply unit
110 supply blocking unit
111 magnet unit
112 first switch unit
113 magnetic material unit
114 switch operation unit
115 second switch unit
152 sold-out detection unit
153 supply detection unit
154 transmission unit
154a output terminal
200 first communication apparatus
202a to 202f input terminal
300 second communication apparatus
305a output terminal
400 communication network
500 management server
505 display unit

The invention claimed is:

1. An article supply device comprising:
an article container unit from which an article is supplied;
a supply operation unit that is connected to a shaft and is rotatable with respect to a front wall;
a switch operation unit that is connected to the shaft;

a press switch that is physically pressed by the switch operation unit when the shaft is rotated by operation of the supply operation unit;
an article supply unit that supplies the article by transferring the rotation of the shaft to the article supply unit in response to an actuation performed on the supply operation unit if the article is in stock in the article container unit;
a supply blocking unit that prevents the article supply unit from supplying the article in response to the actuation performed on the supply operation unit when the article is out of stock in the article container unit; and
a transmission unit that transmits a digital supply signal in response to the switch operation unit pressing the press switch when the article is in stock in the article container unit, and a digital sold-out signal when the supply blocking unit is preventing the article supply unit from supplying the article when the article is out of stock in the article container unit.

2. The article supply device according to claim 1, further comprising:
a sold-out detection unit that detects selling out when the supply blocking unit is displaced to a position where the supply blocking unit causes the article supply unit to be inoperable.

3. The article supply device according to claim 2, wherein the sold-out detection unit comprises at least a magnet positioned at the supply blocking unit, and a first switch unit that is operated at least in part by magnetic force from the magnet.

4. The article supply device according to claim 3, wherein the sold-out detection unit is configured to transfer magnetic force from the magnet to the first switch unit through a magnetic unit.

5. The article supply device according to claim 2, wherein the transmission unit further comprises an output terminal that transmits the sold-out signal detected by the sold-out detection unit.

6. The article supply device according to claim 3, wherein the first switch unit is a reed switch.

7. The article supply device according to claim 1, further comprising:
a communication apparatus that transmits the sold-out signal and the supply signal from the article supply device; and
a management server capable that receives the sold-out signal and the supply signal from the communication device via a communication network.

8. The article supply device system-according to claim 7, wherein the communication apparatus comprises a first communication apparatus connected to an output terminal of the article supply device, and a second communication apparatus that enables wireless communication with the first communication apparatus and that communicates with the management server via the communication network.

9. The article supply device according to claim 8, wherein the first communication apparatus has a plurality of input terminals connectable to the output terminals of a plurality of the article supply devices in a wired manner.

10. The article supply device according to claim 1, further comprising:
a communication apparatus that transmits the sold-out signal from the article supply device; and a management server that receives the sold-out signal from the communication device via a communication network.

11. The article supply device according to claim 10, wherein the management server is configured to recognize selling out when the sold-out signal from the communication device continues for at least a predetermined time period.

12. The article supply device according to claim 1, further comprising:

a communication apparatus that transmits, to a management server, the sold-out signal and the supply signal from the article supply device via a communication network.

13. The article supply device according to claim 1, wherein the transmission unit further comprises an output terminal that transmits the supply signal detected by the press switch.

14. The article supply device according to claim 1, further comprising:

a communication apparatus that transmits, to a management server, the sold-out signal from the article supply device via a communication network.

15. The article supply device according to claim 14, wherein the communication apparatus comprises a first communication apparatus connected to an output terminal of the article supply device, and a second communication apparatus that enables wireless communication with the first communication apparatus and that communicates with the management server via the communication network.

16. The article supply device according to claim 15, wherein the first communication apparatus has a plurality of input terminals connectable to the output terminals of a plurality of the article supply devices in a wired manner.

* * * * *